(12) United States Patent
Syed et al.

(10) Patent No.: US 11,899,985 B1
(45) Date of Patent: Feb. 13, 2024

(54) VIRTUAL MODULES IN TCAM

(71) Applicant: DreamBig Semiconductor Inc., San Jose, CA (US)

(72) Inventors: Sohail A Syed, San Jose, CA (US); Hillel Gazit, Palo Alto, CA (US); Hon Luu, San Jose, CA (US); Pranab Ghosh, Pleasonton, CA (US)

(73) Assignee: DreamBig Semiconductor Inc., San Jose, CA (US)

( * ) Notice: Subject to any disclaimer, the term of this patent is extended or adjusted under 35 U.S.C. 154(b) by 126 days.

(21) Appl. No.: 17/710,840

(22) Filed: Mar. 31, 2022

Related U.S. Application Data

(60) Provisional application No. 63/168,921, filed on Mar. 31, 2021.

(51) Int. Cl.
  *G06F 3/06* (2006.01)
  *G06F 9/455* (2018.01)

(52) U.S. Cl.
  CPC .......... *G06F 3/0664* (2013.01); *G06F 3/0604* (2013.01); *G06F 3/0673* (2013.01); *G06F 9/45558* (2013.01); *G06F 2009/45583* (2013.01)

(58) Field of Classification Search
  CPC .. G06F 3/0604; G06F 3/0673; G06F 9/45558; G06F 3/0664; G06F 2009/45583
  USPC ........................................................ 711/108
  See application file for complete search history.

(56) References Cited

U.S. PATENT DOCUMENTS

| | | |
|---|---|---|
| 7,643,353 B1 | 1/2010 | Srinivasan et al. |
| 8,195,873 B2 | 6/2012 | Gazit |
| 9,094,307 B1 | 7/2015 | Edsall et al. |
| 9,262,312 B1 | 2/2016 | Gazit et al. |
| 9,306,851 B1 | 4/2016 | Gazit et al. |
| 9,424,366 B1 | 8/2016 | Gazit et al. |
| 9,639,501 B1 | 5/2017 | Gazit et al. |
| 10,254,968 B1 | 4/2019 | Gazit et al. |
| 10,318,587 B1 | 6/2019 | Bosshart et al. |

(Continued)

FOREIGN PATENT DOCUMENTS

| | | |
|---|---|---|
| WO | WO-98/007160 | 2/1998 |
| WO | 2007038805 | 4/2007 |

OTHER PUBLICATIONS

"U.S. Appl. No. 17/710,891, Response filed Jan. 18, 2023 to Ex Parte Quayle Action mailed Nov. 25, 2022", 5 pages.

(Continued)

*Primary Examiner* — Hua J Song
(74) *Attorney, Agent, or Firm* — Schwegman Lundberg & Woessner, P.A.

(57) ABSTRACT

A content addressable memory circuit comprising: a memory device array including multiple memory devices coupled for simultaneous access to memory address locations that share a common memory address; multiple virtual modules (VMs), wherein each VM stores a data set that includes key values stored within an assigned memory address range within the memory array that are assigned to the VM; wherein each VM, stores a virtual hash table in non-transitory memory, that associates hash values with memory addresses within an assigned memory address range of the VM; hash logic is operable to determine a hash value, based upon a received key value and a respective assigned memory address range; and memory controller logic is operable to use a virtual hash table to access a memory address in an assigned memory address range, based upon the determined hash value.

12 Claims, 11 Drawing Sheets

(56) References Cited

U.S. PATENT DOCUMENTS

| | | |
|---|---|---|
| 10,778,721 B1 | 9/2020 | Holbrook et al. |
| 10,887,233 B2 | 1/2021 | Labonte et al. |
| 11,683,039 B1 | 6/2023 | Syed et al. |
| 11,720,492 B1 | 8/2023 | Syed et al. |
| 2009/0190404 A1 | 7/2009 | Roohparvar |
| 2012/0198107 A1 | 8/2012 | Mckean et al. |
| 2013/0242632 A1 | 9/2013 | Wada |
| 2015/0006808 A1 | 1/2015 | Miller et al. |
| 2015/0121034 A1 | 4/2015 | Steele, Jr. et al. |
| 2015/0169467 A1 | 6/2015 | Chase et al. |
| 2017/0040059 A1 | 2/2017 | Arsovski et al. |
| 2017/0242618 A1 | 8/2017 | Tran et al. |
| 2018/0039662 A1 | 2/2018 | Asai et al. |
| 2023/0016020 A1 | 1/2023 | Kim et al. |
| 2023/0251782 A1 | 8/2023 | Chang et al. |

OTHER PUBLICATIONS

"U.S. Appl. No. 17/710,891, Notice of Allowance dated Feb. 8, 2023", 8 pages.
"U.S. Appl. No. 17/710,678, Notice of Allowance dated Mar. 16, 2023", 19 pages.
"U.S. Appl. No. 17/710,678, Corrected Notice of Allowability dated Mar. 30, 2023", 4 pages.
"U.S. Appl. No. 17/710,678, Corrected Notice of Allowability dated Apr. 10, 2023", 4 pages.
"U.S. Appl. No. 17/710,891, Corrected Notice of Allowability dated May 17, 2023", 2 pages.
"U.S. Appl. No. 17/710,629, Non Final Office Action dated May 24, 2023", 10 pages.
Bremier-Barr, Anat, "Encoding Short Ranges in TCAM Without Expansion: Efficient Algorithm and Applications", SPAA '16, Jul. 11-13, 2016, Pacific Grove, CA, (2016), pp. 35-46.
Kyungbae, Park, "Resource-Efficient SRAM-Based Ternary Content Addressable Memory Ali Ahmed", Sanghyeon Baeg IEEE Transactions on Very Large Scale Integration (VLSI) Systems Year: 2017 | vol. 25, Issue: 4 | Journal Article | Publisher: IEEE, (Jan. 1, 2017), 5 pages.
Liu, Huan, "Efficient Mapping of Range Classifier into Ternary-CAM", Proceedings 10th Symposium on High Performance Interconnects (HOTI '02), (2002), 6 pages.
Meiners, Chad R., "Bit Weaving: A Non-Prefix Approach to Compressing Packet Classifiers in TCAMs", IEEE ACM Transactions on Networking, vol. 20, No. 2, (Apr. 2011), pp. 488-500.
Ullah, Inayat, "EE-TCAM: An Energy-Efficient SRAM-Based TCAM on FPGA", Electronics, 7(9), 186, (2018), 15 pages.
Ullah, Zahid, "E-TCAM: An Efficient SRAM-Based Architecture for TCAM", Circuits, Systems, and Signal Processing, 33, (2014), pp. 3123-3144.
Vegesna, S. M. Srinivasavarma, "A Novel Rule Mapping on TCAM for Power Efficient Packet Classification", ACM Transactions on Design Automation of Electronic Systems, vol. 24, .No. 5, Article 48, (Jun. 2019), 23 pages.
Zhang, Chaoqin, "RETCAM: An Efficient TCAM Compression Model for Flow Table of OpenFlow", Journal of Communications and Networks, vol. 22, No. 6, (Dec. 2020), pp. 484-491.
"U.S. Appl. No. 17/710,891, Ex Parte Quayle Action mailed Nov. 25, 2022", 7 pgs.
Demetriades, Socrates, et al., "An Efficient Hardware-basedMulti-hash Scheme for High Speed IP Lookup", Department of Computer Science University of Pittsburg, (Jun. 2008), 8 pages.
Meiners, Chad R., et al., "Algorithmic Approaches to Redesigning TCAM Based Systems", *Sigmetrics, '08IGMETRICS*, Jun. 2-6, 2008, Annapolis, Maryland, (Jun. 2008), 2 pgs.
Pagiamtzis, Kostas, et al., "Content-Addressable Memory (CAM) Circuits and Architectures: A Tutorial and Survey", *IEEE Journal of Solid-State Circuits*, 41(3), (Mar. 2006), 16 pages.
Ravikumar, V. C., et al., "TCAM Architecture for IP Lookup Using Prefix Properties", Published by the IEEE Computer Society 0272-1732/04, (Mar.-Apr. 2004), 10 pages.
Sheu, Jang-Ping, et al., "Efficient TCAM Rules Distribution Algorithms in Software-Defined Networking", *IEEE Transactions on Network and Service Management*, 15(2), (Jun. 2018), 12 pages.
Song, Yibo, et al., "A Low-power Content-Addressable Memory (CAM) Using Pipelined Search Scheme", *ICWET '10: Proceedings of the International Conference and Workshop on Emerging Trends in Technology*, (Dec. 2009), 6 pages.
Trinh, Nguyen, et al., "Algorithmic TCAM on FPGA with data collision approach", *Indonesian Journal of Electrical Engineering and Computer Science*, (Apr. 2021), 89-96.
"U.S. Appl. No. 17/710,678, Corrected Notice of Allowability dated Jun. 26, 2023", 2 pgs.
"U.S. Appl. No. 17/710,629, Response filed Jul. 10, 2023 to Non Final Office Action dated May 24, 2023", 16 pgs.
"U.S. Appl. No. 17/710,572, Non Final Office Action dated Jul. 18, 2023", 13 pgs.
"U.S. Appl. No. 17/710,572, Examiner Interview Summary dated Aug. 23, 2023", 2 pgs.
"U.S. Appl. No. 17/710,572, Notice of Allowance dated Sep. 25, 2023", 9 pgs.
"U.S. Appl. No. 17/710,798, Response filed Sep. 19, 2023 to Ex Parte Quayle Action mailed Sep. 8, 2023", 8 pgs.
"U.S. Appl. No. 17/710,798, Ex Parte Quayle Action mailed Sep. 8, 2023", 8 pgs.
"U.S. Appl. No. 17/710,572, Response filed Sep. 6, 2023 to Non Final Office Action dated Jul. 18, 2023", 20 pgs.

| KEY | RULE |
|---|---|

*Fig.2*

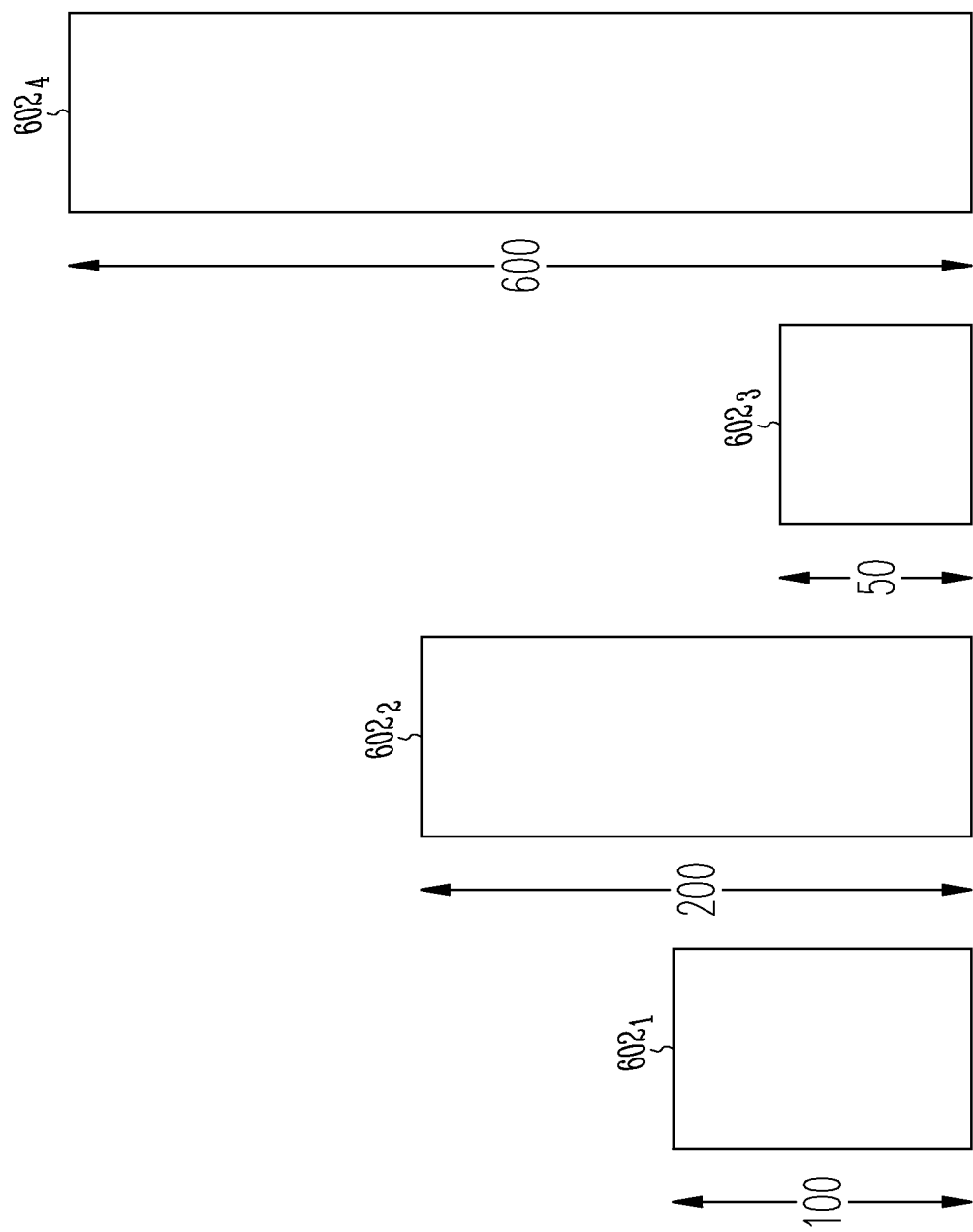

VIRTUAL MODULES IN TCAM

CROSS-REFERENCE TO RELATED APPLICATION

This application claims priority to U.S. provisional application Ser. No. 63/168,921, filed Mar. 31, 2021, entitled, ALGORITHMIC TERNARY CONTENT ADDRESSABLE MEMORY, which is incorporated herein in its entirety by this reference.

BACKGROUND

Content addressable memory (CAM) is a special type of memory that determines memory storage locations to associate with input data based upon the input data. A typical memory, such as a random access memory (RAM), is accessed based upon memory addresses. In contrast a CAM is accessed based upon content stored at one or more memory addresses. During a read operation of a typical memory, the memory receives an address value as an input and, in response, outputs a data value stored at a memory location corresponding to the received address value. A CAM operates in a different manner. During a read operation of a CAM, the CAM receives as input, content data that may be stored at some location in the CAM, and outputs an indication of whether that data value is present at a CAM address location. The content data received as input to a CAM during a read operation is commonly referred to as a search expression or as a key. During a typical CAM read operation, a CAM searches for stored entries in the CAM that match the key. A typical CAM can compare in parallel each of a plurality of content data values stored within the CAM with a key to determine whether there exists a stored content data value that matches the key and if so, output an indication of the match. Thus, a CAM accesses content (i.e., stored data values) by comparing content stored within the CAM with a key.

Applications of CAM include routing Internet packets, cache memory for microprocessors, and artificial intelligence to name just a few examples. Many network devices (e.g., bridges, switches, routers, gateways, network proxies), for example, use a ternary CAM for routing operations. A ternary CAM (TCAM) is referred to as ternary because it can store data in any of three different states: logic 0, logic 1 and X. Data having an "X" or "don't care" state is of no relevance to a content search being conducted. Algorithmic RAM-based TCAM typically uses two-bit values stored in RAM to represent individual ternary states. In other words, each of TCAM logic 0, logic 1, and X often is represented in RAM-based TCAM as a different combination of two binary bits.

Integrated circuits (ICs) have been used in the past that contain multiple physical TCAM modules that can be used to store different sets of data in different physical TCAM modules. The TCAM modules located on an IC typically have identical physical storage capacity. However, data set sizes may differ. Some data sets may be relatively large, and other data sets may be relatively small. As a result, there can be uneven usage of the multiple physical TCAM modules located on a single IC. TCAM modules used to store smaller size data sets may have a significantly larger number of empty memory locations than TCAM modules used to store larger size data sets. Thus, there is a need for more efficient usage of physical TCAM modules located on an integrated circuit.

SUMMARY

In one aspect, a content addressable memory circuit is provided that includes a memory device array including multiple memory devices coupled for simultaneous access to memory address locations that share a common memory address. Multiple virtual modules (VMs), are stored within the memory circuit. Each VM stores a data set that includes key values stored within an assigned memory address range within the memory array that are assigned to the VM. Each VM also stores a virtual hash table in non-transitory memory, that associates hash values with memory addresses within the assigned memory address range of the VM. An interface can receive a key value and to receive a VM identifier. An information structure indicates different assigned memory address ranges for two or more of the multiple VMs. Hash logic is operable to determine a hash value, based upon a received key value and a respective assigned memory address range indicated in the information structure for a VM identified by a received VM identifier. Memory controller logic is operable to use a virtual hash table of the identified VM to access a memory address in the assigned memory address range of the identified VM, based upon the determined hash value.

In another aspect, a method to control a content addressable memory circuit that includes a memory device array including multiple memory devices coupled for simultaneous access to memory address locations that share a memory address. Multiple data sets are stored. Each data set includes key values is stored within a different assigned memory address range within the memory array. Multiple virtual hash tables are stored in one or more non-transitory memories. Each virtual hash table associates hash values with memory addresses within a different one of the assigned memory address ranges. An information structure is used to indicate different assigned memory address ranges for two or more of the data sets. A key value and a data set identifier are received. A hash value is determined based upon the received key value and upon an assigned memory address range indicated in the information structure for a data set identified by the received data set identifier. A virtual hash table is used, that associates hash values with memory addresses within the assigned memory address range indicated in the information structure for the data set identified by the received data set identifier, to access a memory address based upon the determined hash value.

BRIEF DESCRIPTION OF DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 2 is an illustrative drawing representing an example content data record that includes a key and an associated rule searched based upon the key.

FIG. 6 is an illustrative drawing representing multiple example data sets suitable for storage within virtual modules of FIG. 5.

DETAILED DESCRIPTION

Figure 1:
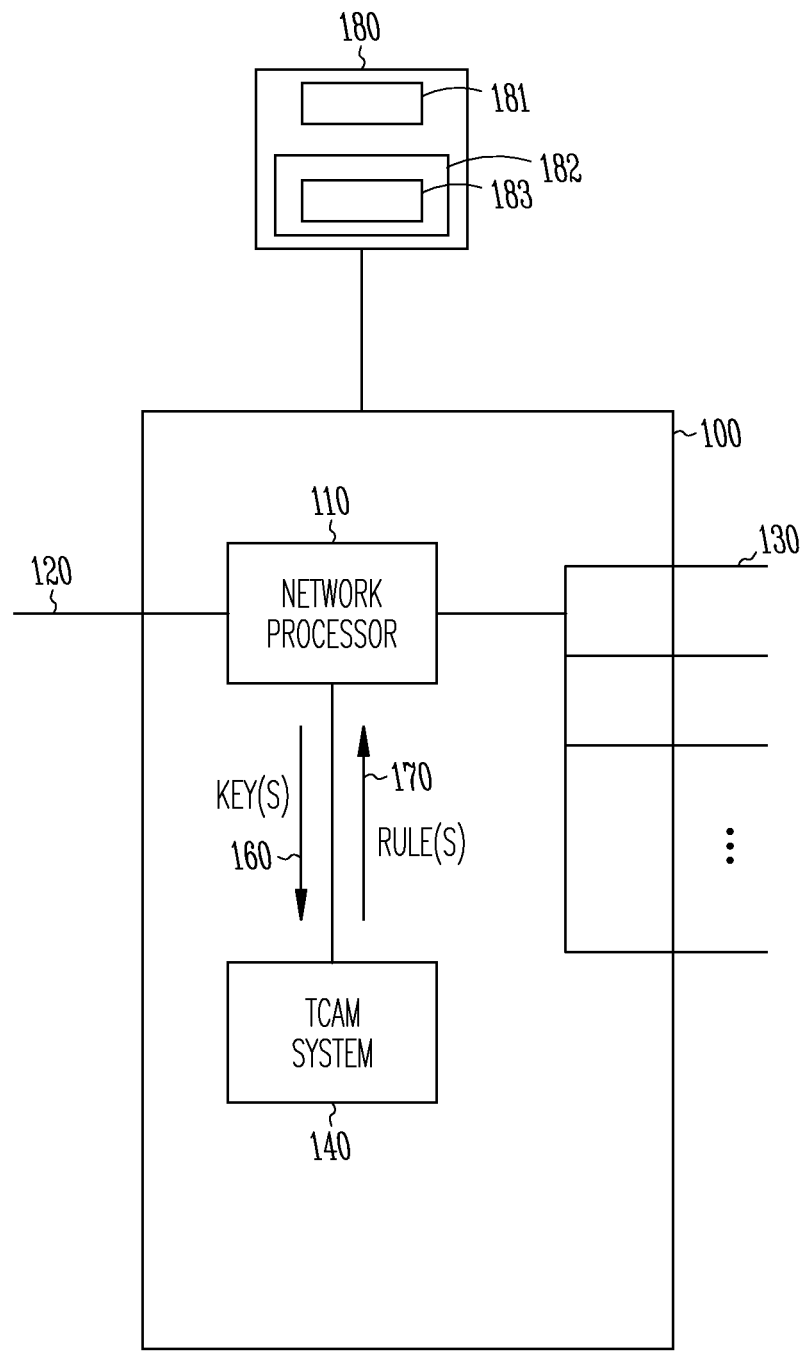
FIG. 1 is an illustrative drawing showing an example network device in accordance with some embodiments.

Network Device:

FIG. 1 is an illustrative drawing showing an example network device 100. The network device 100 can include one or more integrated circuit (IC) devices, a larger device, such as a router or switch, or a combination of these. In some implementations, the network device 100 is coupled with a computing machine 180 within a network communications apparatus. The computing machine 180 can include multiple processor circuits 181 coupled to non-transitory memory 182 that includes instructions 183 to configure the computing machine 180 to perform operations described herein. In some implementations, the network device 100 is a network communications apparatus and includes the computing machine 180. The network device 100 can be coupled with a computer network, such as a local area network (LAN) or a wide area network (WAN), and processes data packets that comprise ordered sequences of binary data values.

The network device 100 includes a network processor device 110, which receives the packets or portions of packets on an input port or interface 120. The network processor 110 parses incoming packet information to identify relevant data fields that provide information for handling network operations, such as routing and forwarding. The network processor 110 can be coupled with a TCAM-based network rules search engine 140, hereinafter referred to as the "TCAM system" 140, which assists in determining appropriate actions to take in response to receipt of packets over a network. The network processor 110 extracts information from the packets, referred to as key information 160. The key information is used to identify rules that determine appropriate actions to take in response to the received packets. The key information represents data bits within a packet that indicate packet information such as network addresses or portions thereof, port numbers, other header and trailer information, or combinations thereof, for example. The network processor 110 can generate key information, also referred as "keys", that use ternary value bits, which can have any of three states, logic 0, logic 1, or X ("don't care"), to represent the binary bits extracted from a packet. In general, ternary value bits within a key that represent a logic value 0 or a logic value 1 contribute to identifying a rule that determines an action to take based upon a packet represented by the key, and ternary value bits within a key that represent an X state do not contribute to identifying a rule that determines an action take based upon the packet represented by the key.

Figure 2:
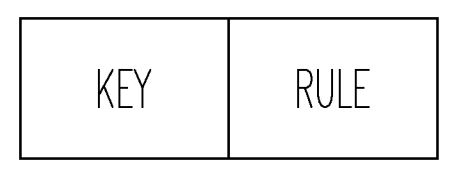

The network processor 110 sends ternary key information 160 to the TCAM system 140, which stores rules associated with such key information that indicate corresponding action to take. In response to receipt of key information 160 corresponding to a packet, the TCAM system 140 returns one or more corresponding rules 170 identified using the key information 160. The network processor 110 determines actions to take based on the returned one or more rules 170. Such actions can include outputting a packet on a selected output port or interface 130 or dropping a packet, as appropriate, for example. The TCAM system 140 includes one or more memory devices to store keys in association with corresponding rules 170. Matches between previously stored keys and keys provided by the network processor 110, in response to received packets, are searched to identify rules to use to route or switch the received packets. FIG. 2 is an illustrative drawing representing an example content data record, stored in a memory device, that includes a key and an associated rule searched based upon the key.

Figure 3:
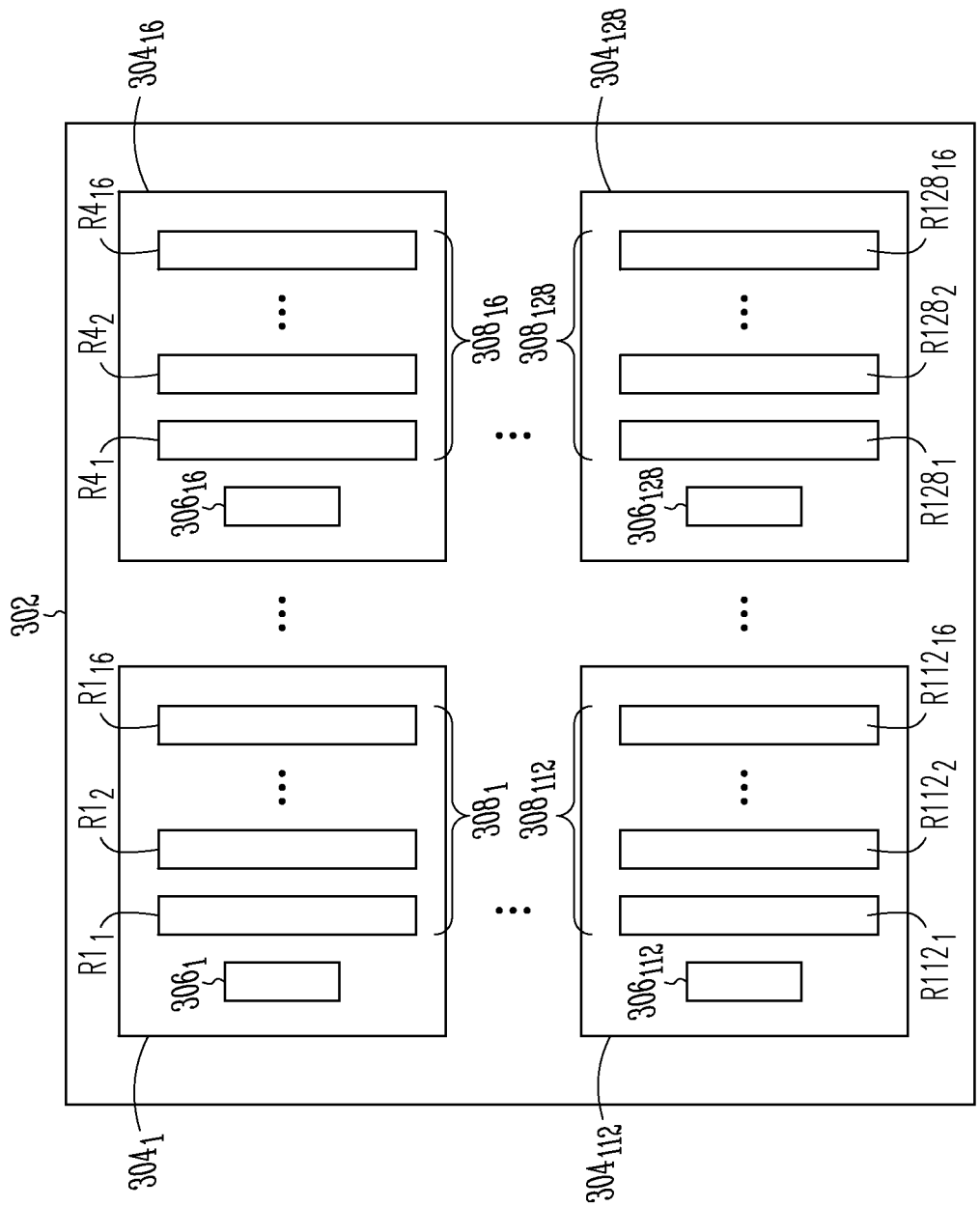
FIG. 3 is an illustrative drawing representing an example integrated circuit that includes multiple TCAM modules.

TCAM System:

FIG. 3 is an illustrative drawing representing an example integrated circuit TCAM system 302 that includes multiple TCAM memory modules $304_1$-$304_{128}$. Each TCAM memory module $304_1$-$304_{128}$ includes a corresponding hash RAM $306_1$-$306_{128}$ and a corresponding data RAM array $308_1$-$308_{128}$. Each data RAM array includes multiple data RAMs. More specifically, each data RAM array includes 16 data RAMs. For example, a first data RAM array $304_1$ includes data RAMs $R1_1$-$R1_{16}$. A 128 data RAM array $306_{128}$ includes data RAMs $R128_1$-$R128_{16}$. The TCAM system 302 is shown with 128 TCAM memory modules and 16 data RAMs per TCAM memory module. However, an example integrated circuit TCAM system 302 can include a smaller number of TCAM memory modules such as 64 TCAM memory modules or a larger number of TCAM memory modules such as 256 TCAM modules and can include a different number of data RAMs per TCAM module, for example.

Figure 4:
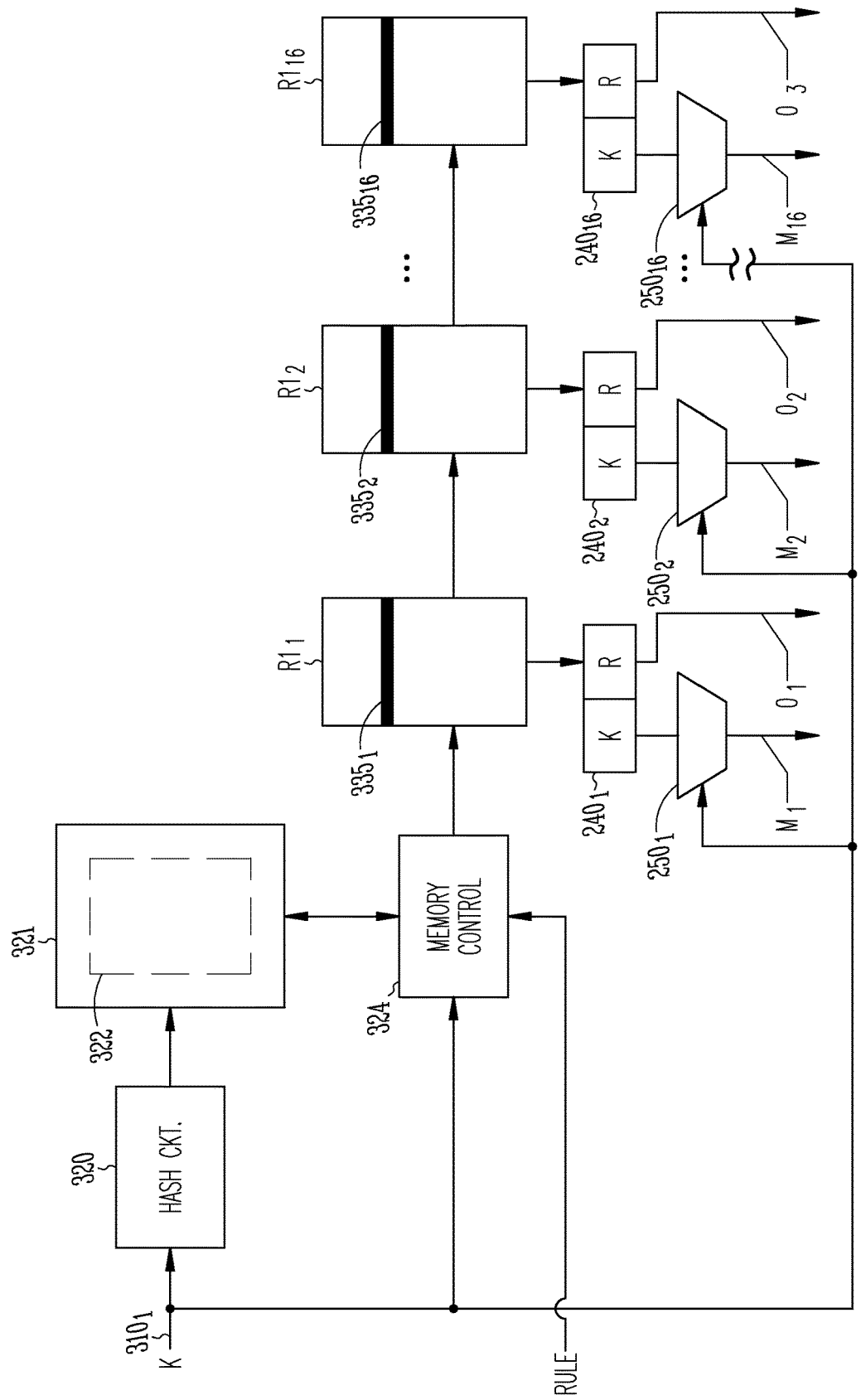
FIG. 4 is an illustrative drawing showing an example TCAM module in accordance with some embodiments.

FIG. 4 is an illustrative drawing showing certain details of an example first TCAM module $304_1$ implemented using algorithmic TCAM in accordance with some embodiments. The TCAM system $304_1$ includes an input interface $310_1$ on which a ternary key is received, an input interface $310_2$ on which a corresponding rule is received, hash logic circuitry 320, hash table storage device 321 that stores a hash table 322, multiple data RAM memory devices $R1_1$-$R1_{15}$, and storage control logic circuitry 324. The hash logic 320 produces hash values for storage within the hash table 322, to acts as address pointers to indicate memory location segments within the memory device array $R1_1$-$R1_{15}$ where key values and corresponding rules are stored. The memory control logic 324 controls access to memory location segments memory devices $R1_1$-$R1_{16}$ based upon address pointers within the hash table 322.

The memory device array $R1_1$-$R1_{15}$ can include integrated circuit RAM memory devices of various types, such Static RAM (SRAM), Dynamic RAM (DRAM), Synchronous DRAM (SDRAM), Flash RAM, etc. For example, each memory device $R1_1$-$R1_{15}$ can be a 512×256 RAM. In addition, each of memory devices $R1_1$-$R1_{15}$ can have an associated output buffer circuit $R1_1$-$R1_{16}$ and comparator circuit $R1_1$-$R1_{16}$. The memory devices $R1_1$-$R1_{16}$ and associated buffers $340_1$-$340_{16}$ and comparators $350_1$-$350_{16}$.

Each memory address of the example first memory module $304_1$ corresponds to sixteen memory location segments, e.g., wordlines, one within each of the memory devices $R1_1$-$R1_{16}$. During each read or write, each of the sixteen memory devices $R1_1$-$R1_{16}$ is simultaneously accessed using a common shared memory address.

The example TCAM module $304_1$ includes sixteen memory devices $R1_1$-$R1_{16}$. However, the number of memory devices employed in a TCAM module $304_1$ (e.g., one, two, four, eight, sixteen, etc.) can vary with implementation. The hash logic 320 can be implemented in hardware or software. For instance, an example TCAM module $304_1$ can use the computing machine 180 to implement the hash logic 320. The hash logic 320 is operable during a data write operations to determine hash values, based upon received keys, that can be used to identify address locations within a hash table 322 of address pointers to to memory address location segments within the multiple memory devices $R1_1$-$R1_{16}$ in which to store the received keys. The hash logic 320 is operable during data read operations to determine hash values based upon received keys, to match with address pointers stored in the hash table 322, to indicate memory segment locations within memory devices $R1_1$-$R1_{16}$ from which to read previously stored keys and associated rules.

The hash logic 320 uses a logical or mathematical hash function to determine hash values based upon one or more ternary bits within key values received at the interface $310_1$. The memory controller 324 uses the hash vales to determine memory address location segments to access memory addresses in the memory devices $R1_1$-$R1_{16}$ during reads and writes. The hash logic 320 receives a key as input at interface $310_1$ and based upon the received key, generates a value referred to as a hash value or hash that can be used to assign a received key to a common memory segment, e.g., a common wordline, that is present within each of the memory devices $R1_1$-$R1_{16}$.

Write:

During a write, a key value (K) is received at first input interface lines $310_1$ and rule information (R) is received at second input interface lines $310_2$. Example hash logic 320 generates a hash value in response to the key value received at the key input $310_1$, which indicates a hash table location in which to store a pointer to a memory address location segment in which to store the key value. An example address pointer points to a common memory address that is present within each of memory devices $R1_1$-$R1_{15}$. An example common memory address can include corresponding wordlines $335_0$-$335_{15}$ present within respective memory devices $R1_1$-$R1_{16}$. The memory controller 324 determines a memory device from among memory devices $R1_1$-$R1_{16}$ in which to store the key and a corresponding rule at a determined common memory address. For example, the memory controller may determine to store the key and associated rule at wordline $335_1$ in memory device $R1_1$. A key and a corresponding rule may be referred to collectively herein as a "content data".

Read:

During a read, a key value is received at the key interface $310_1$. The hash logic 320 produces a hash value in response to the received key value. The hash value indicates a location in the hash table 322 that stores a pointer to identify a common memory location segment present within each of the memory devices $R_1$-$R_{16}$, such as a respective wordlines $335_0$-$335_{15}$, in which to search for a match for the received key value. The memory controller 324 causes a read access of content data, at the identified common memory segment location, from the multiple memory devices $R1_1$-$R1_{16}$. Output buffer circuits $340_1$-$340_{16}$ receive content data output from the memory devices. The content data includes keys and corresponding rule information previously written to the memory devices. The comparators $350_1$-$350_{16}$ compare stored key values received at corresponding buffers $340_0$-$340_{15}$ with the key received at the key interface $310_1$ and provide indications of whether there is a match. A comparator $350_1$-$350_{16}$ that detects a match sends a match signal on a corresponding match line $M_1$-$M_{16}$, which causes a corresponding output buffer to provide a rule on an output line $O_1$-$O_{16}$ for return to the network processor 110.

Figure 5:
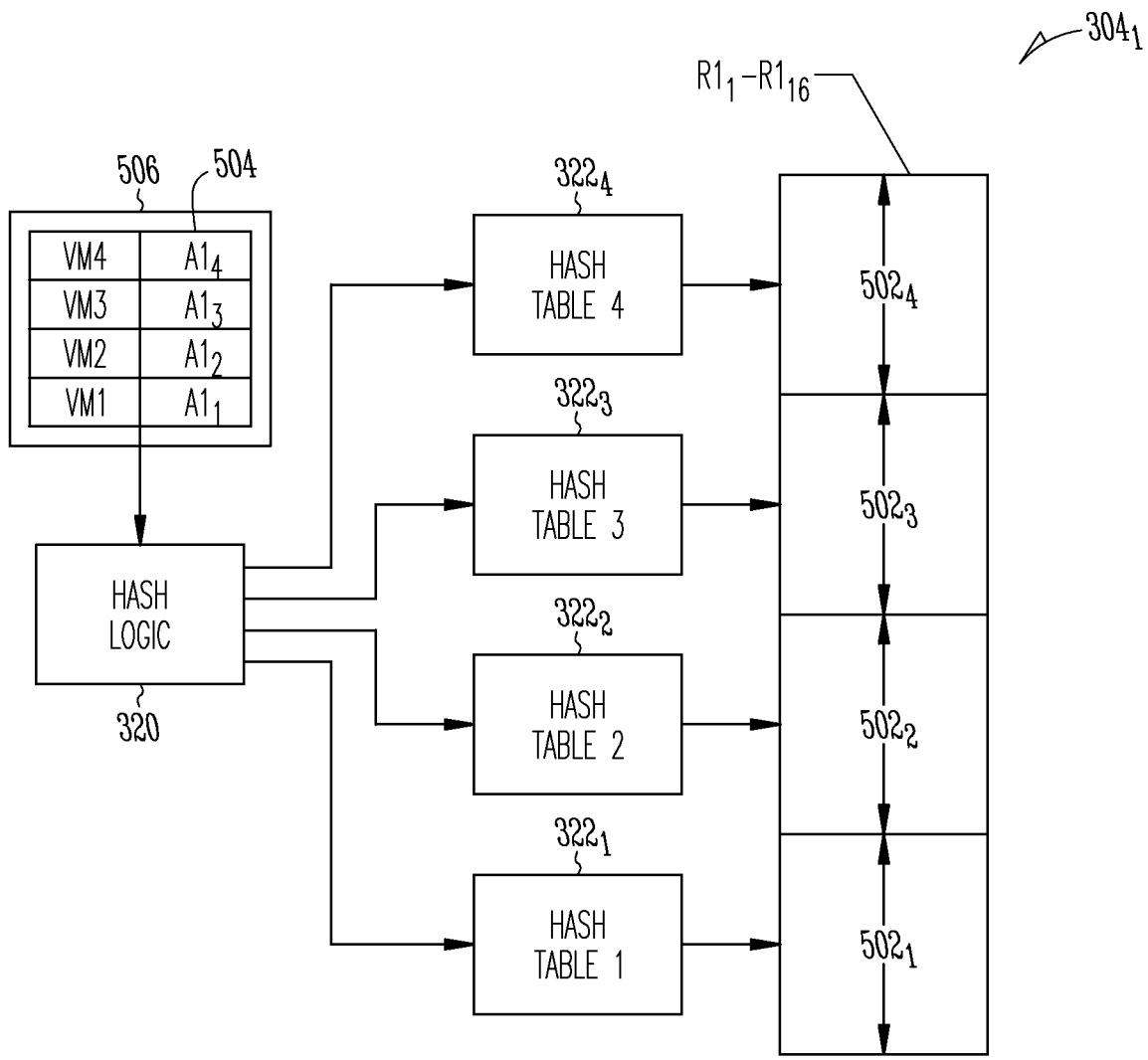
FIG. 5 is an illustrative drawing representing an example physical TCAM module partitioned to include multiple example virtual modules.

Virtual Modules:

FIG. 5 is an illustrative drawing representing an example first TCAM module $304_1$ from among the multiple example TCAM modules $304_1$-$304_{128}$ partitioned into multiple virtual TCAM modules VM1-VM4. The multiple virtual modules share hardware resources of the first TCAM module $304i$. More particularly, the multiple virtual modules share the hash table $322_1$ and the memory device array $R1_1$-$R1_{16}$. The hash table $322_1$ is partitioned into multiple virtual hash tables, $322_1$-1, $322_1$-2, $322_1$-3, and $322_1$-4, each of which is allocated a distinct and separate range of hash table memory locations. The memory devices of the memory array $R1_1$-$R1_{16}$ are partitioned into multiple virtual memory arrays, $R1_1$-1 to $R_{16}$-4, each of which is allocated a distinct and separate range of memory segment locations.

An example first virtual module VM1 includes a first address location range $502_1$ that starts at a first starting address $A1_1$. An example second virtual module VM2 includes a second address location range $502_2$ that starts at a second starting address $A1_2$. An example third virtual module VM3 includes a third address location range $502_3$ that starts at a third starting address $A1_3$. An example fourth virtual module VM4 includes a fourth address location range $502_4$ that starts at a fourth starting address $A1_4$.

An example VM address table 504 stored in a memory device 506 indicates starting addresses within the example second, third, and fourth address ranges. More particularly, an example VM address table indicates for respective virtual modules, an address offset from a base address or starting address of the memory device array, to the virtual module's starting address. The VM address table structure 504 associates the first virtual machine VM1 with a first pointer P1 to the first starting address $A1_1$. The VM address table structure 504 associates the second virtual machine VM2 with a second pointer P2 to the second starting address $A1_2$. The VM address table structure 504 associates the third virtual machine VM3 with a pointer P3 to the third starting address $A1_3$. The VM address table structure 504 associates the fourth virtual machine VM4 with a pointer P4 to the fourth starting address $A1_4$. An alternative example table 504 does not include a pointer offset for the example first virtual module VM1, which has a 0-address offset since the starting address $A1_1$ of the first address range $502_1$ is the base address of the memory array. Each virtual module can store a different set of data, e.g., a different set of keys and corresponding rules. The sizes of the first, section, third, and fourth memory ranges can be tailored to accommodate sizes of the data set to be stored within the range. A smaller size memory range can be allocated to a smaller size data set, and a larger size memory range can be allocated to a larger size data set. Thus, the physical TCAM module $304_1$ can be partitioned to utilize memory locations more efficiently within the memory devices $R1_1$-$R1_{16}$. While the example first module $304_1$ is shown partitioned into four virtual modules, it will be understood that the physical module $304_1$ can be partitioned into a lesser or greater number of virtual modules. Example Data Sets:

FIG. 6 is an illustrative drawing representing multiple example data sets $602_1$-$602_4$ suitable for storage in the example first memory module $304_1$. To simplify the explanation, it is assumed in this example that each memory device of the first memory module $304_1$ has 1000 memory addresses and 16,000 corresponding memory location segments. A first example data set $602_1$ has 100 entries, each capable of being stored at an individual memory location segment at an individual memory device within the memory device array $R1_1$-$R1_{16}$. A second example data set $602_2$ has 200 entries, each capable of being stored at an individual memory location segment at an individual memory device within the memory device array. A third example data set 6023 has 50 entries, each capable of being stored at an individual memory location segment at an individual memory device within the memory device array. A fourth example data set $602_4$ has 600 entries, each capable of being stored at an individual memory location segment at an individual memory device within the memory device array. All four data sets can be stored in the example first memory module $304_1$ since there are a total of 950 entries in the first through fourth data sets $602_1$-$602_4$, and the example first memory module $304_1$ has 1,000 memory segment locations at which to the store entries. In this example, each entry in the data sets $602_1$-$602_4$ is a key value.

Referring to FIGS. 5-6, each data set corresponds to a different virtual hash table and to a different address range. The hash logic 320 can use a first address range $502_1$ of a first data set e.g., $602_1$, indicated by starting address $A1_1$ and $A1_2$ to implement the first hash table $322_1$. The hash logic 320 can use a second address range a second address range $502_2$ of a second data set e.g., $602_2$, indicated by starting address $A1_2$ and $A1_3$ to implement the second hash table $322_2$. The hash logic 320 can use a third address range a third address range $502_3$ of a third data set e.g., $602_3$, indicated by starting address $A1_3$ and $A1_4$ to implement the third hash table $322_2$. The hash logic 320 can use a fourth address range a fourth address range $502_4$ of a fourth data set e.g., $602_3$, indicated by starting address $A1_4$ to implement the fourth hash table $322_2$.

Figure 7A:
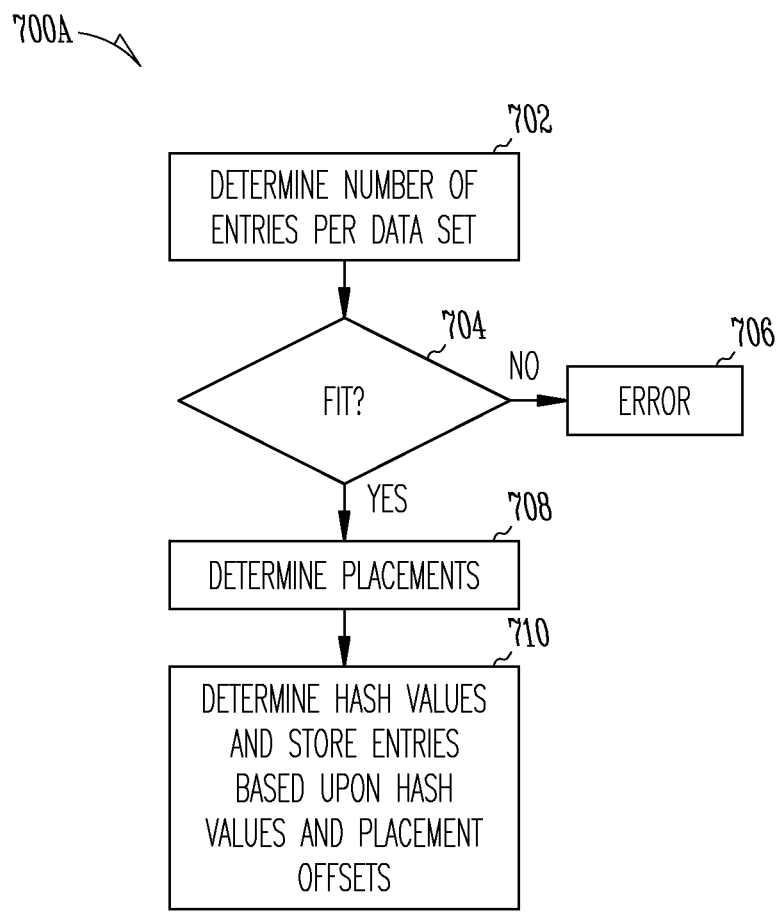
FIG. 7A is an illustrative flow diagram representing an example virtual module write process.

Virtual Module Write:

FIG. 7A is an illustrative flow diagram representing an example virtual module write process 700A. The computing machine 180 can be configured with instructions 183 to implement operations of the example virtual module write process 700. The following explanation is provided with reference to the example first physical TCAM memory module $304_1$ but applies to any one of the physical TCAM modules $304_1$-$304_{128}$. Operation 702 receives the multiple data sets and determines a total number of key value entries in each of multiple candidate data sets to be stored in a physical TCAM module such as the example TCAM module 304i. Decision operation 704 determines whether the multiple data sets can fit within the physical TCAM module. More specifically, an example operation 704 determines whether a total number of entries in the multiple candidate data sets is greater than the number of memory addresses in the physical TCAM module such as the example first physical TCAM module 304i. If the number of entries in the candidate data sets is greater than the number of addresses in the physical TCAM module, then operation 706 declares an error. If the number of entries in the candidate data sets is not greater than the number of addresses in the physical TCAM module, then operation 708 determines respective placement offsets of the data sets within the physical TCAM memory module. Operation 710 determines a separate set of hash values for the entries of each of the multiple data sets and stores the entries of each of the multiple data sets within the physical TCAM memory module based upon the determined hash values and the determined placements.

Figure 7B:
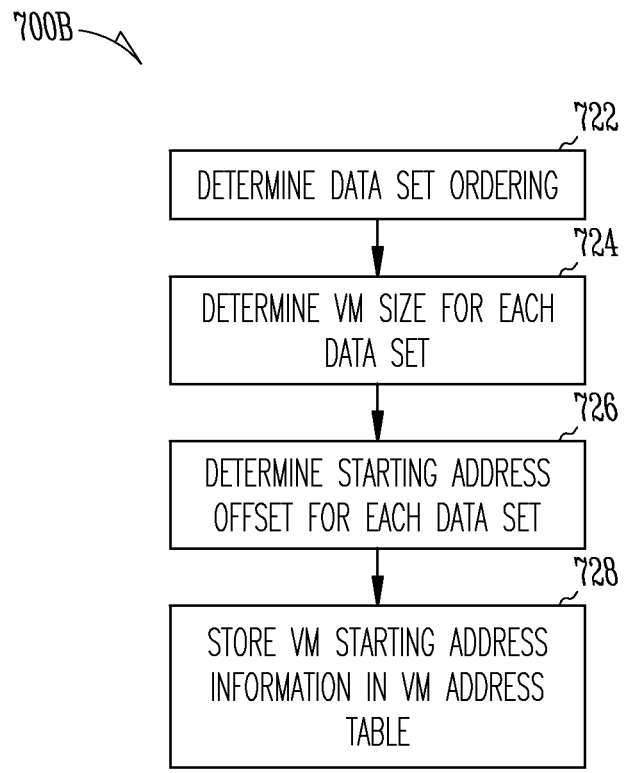
FIG. 7B is an illustrative flow diagram representing certain details of placement determination during the write process of FIG. 7A.

FIG. 7B is an illustrative flow diagram representing a process 700B for the placement determination operation 708 of FIG. 7A. Operation 722 determines an ordering of the data sets within the physical TCAM memory module. An example lower order data set is to be placed in lower value memory locations within the physical TCAM memory module. An example higher order data set is to be placed in higher value memory locations within the physical TCAM memory module. Operation 724 determines a virtual memory (VM) size for each of the data sets. For each data set, a VM corresponding to the data set must be large enough to accommodate all of the entries of the data set. Thus, for each data set, a corresponding VM size must include a number of virtual memory addresses that is at least as large as the number of entries in the data set. Moreover, an example operation 724 may determine a VM size for a data set that is larger than the number entries in the data set so as to provide a buffer region to accommodate additional entries that may be added later to the data set. Operation 726 determines for each data set, a starting address offset for a VM corresponding to the data set, based upon the determined ordering of the data sets and based upon the determined VM sizes determined for the data sets. Operation 728 stores information in a VM address table, such as VM address table 504, that associates an indication of each VM with a corresponding starting address offset.

Figure 7C:
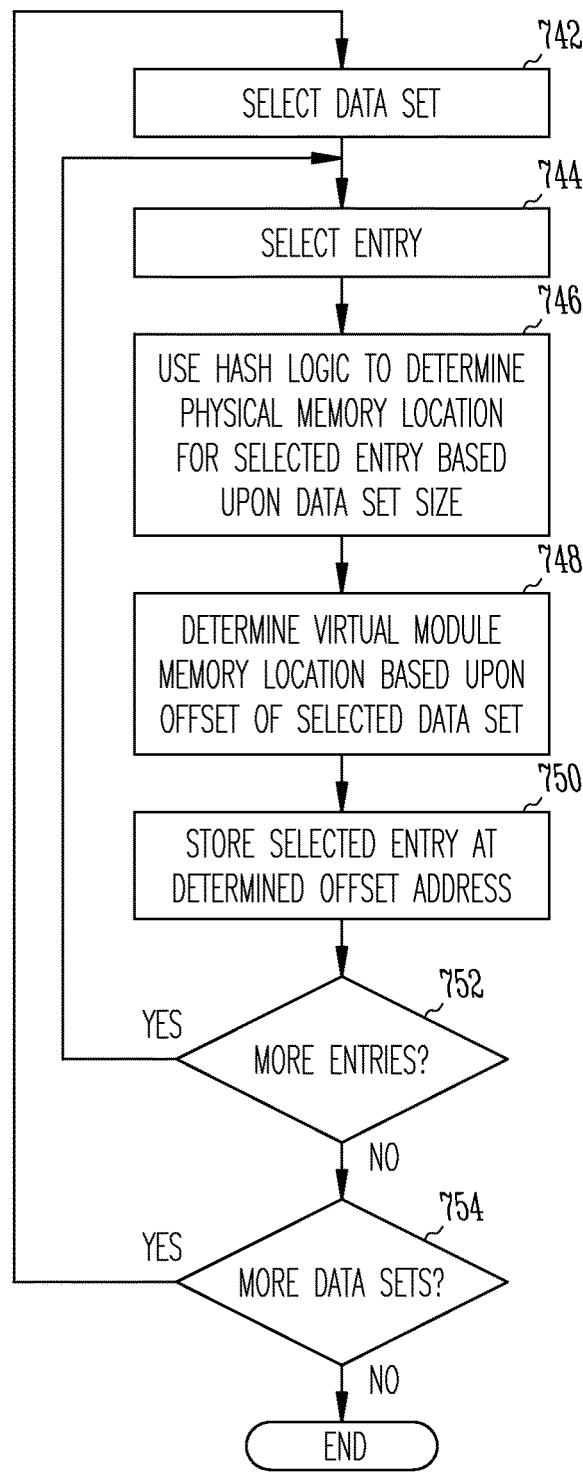
FIG. 7C is an illustrative diagram representing certain details of hash value production and key value storage during the write process of FIG. 7A.

FIG. 7C is an illustrative diagram representing certain a process 700C for the hash value determination and storage operation 710 of FIG. 7A. Operation 742 selects a data set. Operation 744 selects an entry within the selected data set. Operation 746 uses hash logic of the physical TCAM memory module, such as hash logic 320, to determine a physical memory address within a physical TCAM memory module to associate with the selected entry based upon the determined size of the data set. In an example operation 746, the number of hash values determined for a currently selected data set cannot be larger than the number of entries in the data set. An example physical address can be a wordline address shared by the memory devices $R1_1$-$R1_{16}$. Operation 748 determines a virtual memory address in the physical TCAM memory module to correspond to the currently selected entry, based upon the physical address determined for the currently selected entry and based upon the starting address offset determined for the currently selected data set. An example operation 748 adds the determined physical memory address for a currently selected entry to a determined starting address offset to determine the corresponding virtual memory address for the currently selected entry. Operation 750 stores the determined virtual memory address in a virtual hash table corresponding to the currently selected data set and uses memory controller 324 to control storing of the currently selected entry at the determined virtual memory address, such as at a wordline having a physical address that matches the determined virtual memory address, within one of at the within one of the physical memory devices the memory devices $R1_1$-$R1_{16}$. An example operation 750 also may cause memory controller 324 to cause a corresponding rule provided at memory interface such as interface $310_2$ to be stored at the same memory location. Operation 752 determines whether there is another entry within the currently selected data set for which a hash value has not been determined. If yes, then control flows back to operation 744. If no, then control flows to operation 754, which determine whether there is another data set for which hash values have not been determined. If yes, then control flows back to operation 742. If no, then the operation 710 ends.

Example—Multiple Virtual Modules Implemented in a Physical TCAM Module

Figure 8:
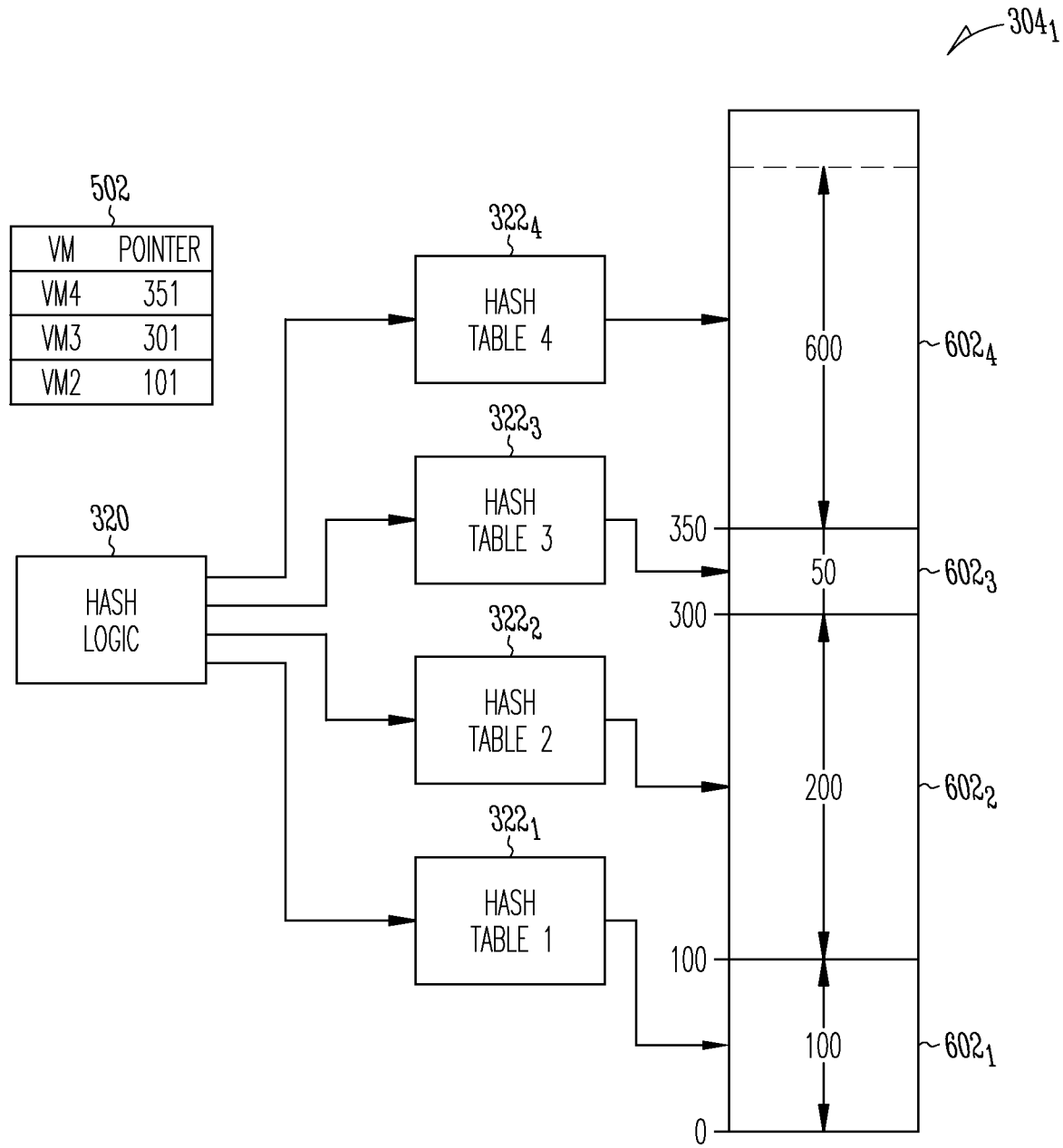
FIG. 8 is an illustrative drawing representing an example physical TCAM memory module configured to implement four example virtual modules corresponding to the example data sets of FIG. 6.

FIG. 8 is an illustrative drawing representing the first example TCAM memory module 304$_1$ configured to implement four example virtual modules VM1-VM4 based upon the four example data sets 602$_1$-602$_4$. In accordance with some embodiments. Recall that for illustrative purposes it is assumed that the first example TCAM memory module 304$_1$ has 1000 memory addresses. In this example, it is assumed that operation 722 ordered the first data set 602$_1$ as first in order, ordered the second data set 602$_2$ as second in order, ordered the third data set 602$_3$ as third in order and ordered the fourth data set 602$_4$ as fourth in order. A VM address table 804 associates VMs with starting address offsets. VM2 is associated with address offset 101. VM3 is associated with address offset 301. VM4 is associated with address offset VM4. No address offset is stored for VM1 since, in this example, there is no address offset for VM1.

VM1 includes the first data set 602$_1$ and a first virtual hash table 322$_1$. The first data set is stored in a first physical address range 0-100 of the physical TCAM memory module 304$_1$. The first virtual hash table 322$_1$ includes pointers to memory addresses in the first physical address range 0-100 at which entries within the first data set 602$_1$ are stored.

VM2 includes the second data set 602$_2$ and a second virtual hash table 322$_2$. The second data set is stored in a second physical address range 101-300 of the physical TCAM memory module 304$_1$. The second virtual hash table 322$_2$ includes pointers to memory addresses in the second physical address range 101-300 at which entries within the second data set 602$_2$ are stored.

VM3 includes the third data set 602$_3$ and a third virtual hash table 322$_3$. The third data set is stored in a third physical address range 301-350 of the physical TCAM memory module 304$i$. The third virtual hash table 322$_3$ includes pointers to memory addresses in the third physical address range 301-350 at which entries within the third data set 602$_3$ are stored.

VM4 includes the fourth data set 602$_4$ and a fourth virtual hash table 322$_4$. The fourth data set is stored in a fourth physical address range 351-950 of the physical TCAM memory module 304$i$. The fourth virtual hash table 322$_4$ includes pointers to memory addresses in the fourth physical address range 351-950 at which entries within the fourth data set 602$_4$ are stored.

Figure 9:
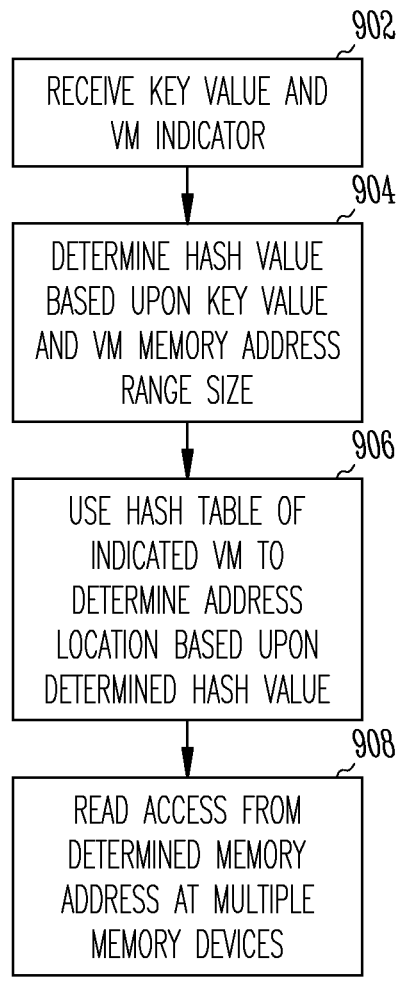
FIG. 9 is an illustrative flow diagram representing an example virtual module read process.

Virtual Module Read:

FIG. 9 is an illustrative flow diagram representing an example virtual module read process 900. The computing machine 180 can be configured with instructions 183 to implement operations of the example virtual module read process 900. The following explanation is provided with reference to the example first physical TCAM memory module 304$_1$ but applies to any one of the physical TCAM modules 304$_1$-304$_{128}$. Operation 902 receives a key value and a VM indicator at the first input interface 310$_1$. Operation 904 uses hash logic 320 to determine a hash value corresponding to the received key based upon an address range size of a VM indicated by the received VM indicator. For example, referring to the example data sets of FIG. 6, if a received VM indicator indicates VM2 corresponding to the second data set 602$_2$, then the hash logic 320 determines a hash value for the received key value based upon a physical address range size of 200 memory addresses. In this example, the address range size (200) of the second data set 602$_2$ can be determined based upon a difference between a starting address of the third data set 602$_3$ (301) and a starting address of the second data set 602$_2$ (101). Operation 906 uses a hash table corresponding to the received VM indicator to determine a memory address within the physical TCAM module 304$_1$ corresponding to the received key value. For example, if a received VM indicator indicates VM2 corresponding to the second data set 602$_2$, then operation 906 uses the second virtual hash table 322$_2$ to determine a physical memory address in the TCAM memory module 304$_1$ to be accessed for a read. Operation 908 causes memory controller 324 to cause a read of contents from memory devices R1$_1$-R1$_{16}$ at the determined physical memory address. In response to the read operation, comparators 350$_1$-350$_{16}$ determine whether there is a match between the received key and content information read from a corresponding memory device, and one or more of match lines M$_1$-M$_{16}$ provides an indication of a match.

The above description is presented to enable any person skilled in the art to make and use virtual modules within an algorithmic TCAM. Various modifications to the examples will be readily apparent to those skilled in the art, and the generic principles defined herein may be applied to other embodiments and applications without departing from the spirit and scope of the invention. In the preceding description, numerous details are set forth for the purpose of explanation. However, one of ordinary skill in the art will realize that the invention might be practiced without the use of these specific details. In other instances, well-known processes are shown in block diagram form in order not to obscure the description of the invention with unnecessary detail. Identical reference numerals may be used to represent different views of the same or similar item in different drawings. Thus, the foregoing description and drawings of embodiments in accordance with the present invention are merely illustrative of the principles of the invention. Therefore, it will be understood that various modifications can be made to the embodiments by those skilled in the art without departing from the spirit and scope of the invention, which is defined in the appended claims.

The invention claimed is:

1. A content addressable memory circuit comprising:
    a memory device array including multiple memory devices coupled for simultaneous access to memory address locations that share a common memory address;
    multiple virtual modules (VMs), wherein each VM,
        stores a data set that includes key values stored within an assigned memory address range within the memory array that are assigned to the VM,
        stores a virtual hash table in non-transitory memory, that associates hash values with memory addresses within the assigned memory address range of the VM;
    an interface to receive a key value and to receive a VM identifier;
    an information structure that indicates different assigned memory address ranges for two or more of the multiple VMs;
    hash logic to determine a hash value, based upon a received key value and a respective assigned memory address range indicated in the information structure for a VM identified by a received VM identifier; and
    memory controller logic to use a virtual hash table of the identified VM to access a memory address in the assigned memory address range of the identified VM, based upon the determined hash value.

2. The content addressable memory circuit of claim 1, wherein the memory controller logic is operable during a read operation, to access all memory address locations in the memory device array that share a common memory address in the assigned memory address range that is associated by the virtual hash table of the identified VM with the determined hash value.

3. The content addressable memory circuit of claim 1 further including:
comparator circuitry operable during a read operation, to simultaneously compare the received key value with stored key values output from memory address locations of multiple memory devices in the memory device array that share a memory address associated by the virtual hash table of the identified VM with the determined hash value and to produce one or more comparison results based upon the compare.

4. The content addressable memory circuit of claim 1 further including:
a logic circuit to send a signal indicating a match based upon the one or more comparator results indicating a match between the received key value and a stored key value.

5. The content addressable memory circuit of claim 1, wherein the information structure indicates for one or more VMs, an address offset between a predetermined address and a starting address of an assigned memory address range of the VM.

6. The content addressable memory circuit of claim 1, wherein the memory controller logic is operable during a write operation, to access a single memory address location in the memory device array that shares a common memory address in the assigned memory address range that is associated by the virtual hash table of the identified VM with the determined hash value.

7. The content addressable memory circuit of claim 1, wherein two or more of the assigned memory address ranges within the memory array have different memory range sizes.

8. A method to control a content addressable memory circuit that includes a memory device array including multiple memory devices coupled for simultaneous access to memory address locations that share a memory address, the method comprising:
storing multiple data sets;
wherein each data set includes key values is stored within a different assigned memory address range within the memory array;
storing multiple virtual hash tables in one or more non-transitory memories;
wherein each virtual hash table associates hash values with memory addresses within a different one of the assigned memory address ranges;
using an information structure to indicate different assigned memory address ranges for two or more of the data sets;
receiving a key value and a data set identifier;
determining a hash value, based upon a received key value and upon an assigned memory address range indicated in the information structure for a data set identified by a received data set identifier; and
using a virtual hash table, that associates hash values with memory addresses within the assigned memory address range indicated in the information structure for the data set identified by the received data set identifier, to access a memory address based upon the determined hash value.

9. The method of claim 8 further including:
during a read operation accessing all memory address locations in the memory device array that share the accessed memory address.

10. The method of claim 8 further including:
during a read operation, simultaneously comparing the received key value with stored key values output from memory address locations of multiple memory devices in the memory device array that share the accessed memory address.

11. The method of claim 8 further including:
sending a signal indicating a match based upon the one or more comparator results indicating a match between the received key value and a stored key value.

12. The method of claim 8, wherein two or more of the assigned memory address ranges within the memory array have different memory range sizes.

* * * * *

UNITED STATES PATENT AND TRADEMARK OFFICE
CERTIFICATE OF CORRECTION

PATENT NO. : 11,899,985 B1
APPLICATION NO. : 17/710840
DATED : February 13, 2024
INVENTOR(S) : Syed et al.

Page 1 of 1

It is certified that error appears in the above-identified patent and that said Letters Patent is hereby corrected as shown below:

On the Title Page

On page 2, in Column 2, item (56) under "Other Publications", Lines 13-14, delete "Hardware-basedMulti-hash" and insert --Hardware-Based Multi-hash-- therefor Signed and Sealed this
Eighteenth Day of June, 2024

Katherine Kelly Vidal
*Director of the United States Patent and Trademark Office*